United States Patent Office 3,165,131
Patented Jan. 12, 1965

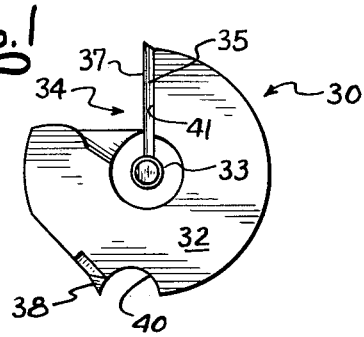
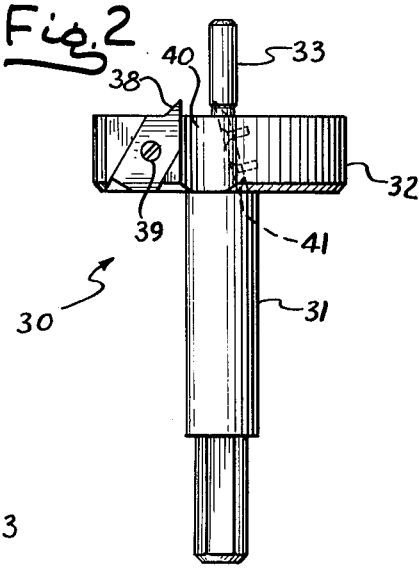
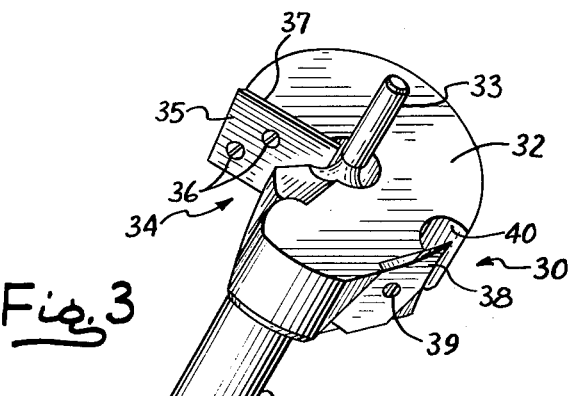
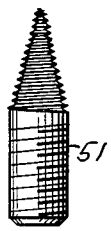
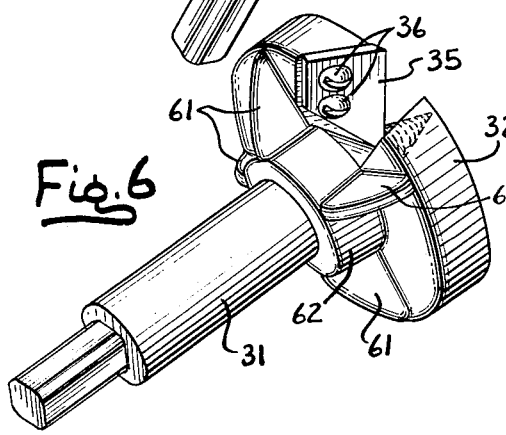

3,165,131
BORING TOOL
Bruce A. Mackey, Libertyville, Ill., assignor to Precision Accessories Inc., a corporation of Florida
Filed May 31, 1962, Ser. No. 199,183
3 Claims. (Cl. 145—126)

This invention relates in general to boring tools and in particular to boring tools that can be utilized for boring a hole having a desired directional alignment with respect to a workpiece.

In woodworking operations, it is often essential that a hole be bored having a substantially perfect directional alignment with respect to the workpiece. For example, the cylindrical housing for a door lock mechanism must be bored in substantially perfect perpendicular alignment with respect to the door panel. A conventional method of assuring proper alignment is to guide the boring tool with an aligning jig. These jigs generally comprise a plate or frame body portion adapted for mounting on the workpiece and having a tubular guideway adapted to receive a tool of substantially equal diameter and maintained in a desired directional alignment during the boring operation. Inasmuch as it requires a relatively large tool to bore a hole big enough to receive and house a door lock mechanism, a correspondingly large jig must be used, and relatively involved mounting means, such as clamps, are required to temporarily secure the jig to the workpiece. These jigs are relatively heavy and cumbersome and considerable time is consumed mounting and dismounting them.

In my aforementioned co-pending application a relatively small light jig is used. This jig guides a relatively small drill in the drilling of a small hole during the desired directional alignment with respect to the workpiece. The jig is then removed and a large rotatable boring tool embodying the features of the invention is utilized to bore the hole. The boring tool is provided with a small pilot member extending coaxially from a large rotatable boring tool and the pilot member is inserted into the small hole. The pilot member engages within the hole so as to arrange the large boring tool in coaxial alignment with the small hole whereby a concentric hole of the desired size and having the desired directional alignment may be bored in the workpiece. By guiding the large boring tool embodying the features of the invention by means of the pilot member and the small pilot hole in the workpiece, the need for a heavy cumbersome jig is eliminated.

One of the difficulties in providing a boring tool for cutting large diameter holes through wood is that they often have to be resharpened and in some cases the entire unit requires resharpening at the factory. Also, to obtain the optimum results when cutting into various types of wood, boring tools with different depths of cut should be employed to correspond to the particular type of wood; however, this would normally be economically prohibitive because of the large number of different type of boring tools that would have to be maintained and stocked.

In accordance with the above, it is an object of this invention to provide a boring tool for boring a hole having a desired structural alignment with respect to a workpiece.

It is another object of this invention to provide a boring tool for which the cutting edges may be readily replaced or resharpened.

Another object of this invention is to provide a boring tool that can be readily adjusted for different depths of cut to facilitate the different kinds of workpieces that are used.

It is another object of this invention to provide a large diameter boring tool which is efficient in operation and inherently inexpensive to manufacture and maintain.

Briefly, in a preferred embodiment of the invention a boring tool is provided that is shaped for boring a hole having a desired directional alignment with respect to a workpiece. As previously stated, a pilot member is positioned on the boring tool so as to fit into a previously drilled pilot hole so as to insure the alignment of the cut of the boring tool as it moves through the workpiece. The boring tool is also provided with replaceable cutting edges that can be readily secured to the boring tool when the cutting edges become dull, or when it is advantageous to use a cutting edge having a different depth of cut.

One embodiment of the boring tool developed for use in conjunction with the previously mentioned light-weight jig comprises a cylindrical pilot member extending coaxially from the tool forwardly of the cutting edge and having a diameter substantially the same as the pilot hole and the guideway in the jig.

The boring tool further comprises a detachable cutting blade for gouging out the interior of the concentric larger hole and a detachable peripheral cutting point for defining the larger hole's circumference. Because of the detachable nature of these elements, they may be removed for sharpening, and like elements may be substituted therefor in the interim.

Other elements, features and objects of the invention will be more fully understood if viewed in light of the drawings of which:

FIG. 1 is a top plan view of one embodiment of the boring tool comprising the features of the invention;

FIG. 2 is an elevational view of the boring tool illustrated in FIG. 1;

FIG. 3 is a perspective view of the boring tool illustrated in FIGS. 1 and 2;

FIG. 4 is a perspective view of an additional pilot member that can be utilized on the boring tool illustrated in FIGS. 1–3.

FIG. 5 is a perspective view of another pilot member that can be utilized on the boring tool illustrated in FIGS. 1–3; and FIG. 6 is a perspective view of another embodiment of the boring tool comprising the features of the invention.

Referring now to the drawings, a preferred type of boring tool is illustrated in FIGS. 1–3 and is indicated generally by the numeral 30 and comprises a rotatable shaft 31 having a cutting head 32 mounted at one end thereof and a cylindrical pilot member 33 extending coaxially therefrom through cutting head 32 and forwardly of the latter (upwardly in the figures).

Cutting head 32 is generally cylindrical in shape with a cutaway segment 34 having generally diverging sides radiating outwardly from pilot member 33. Along an inclined side 41 of cutaway segment 34, a rectangular cutting blade 35 is detachably fastened with screws 36 so that its cutting edge 37 extends in a forwardly direction. A cutting point 38 is detachably fastened to the periphery of head 32 by screw 39 and projects slightly forward of edge 37. Head 32 is cut away adjacent point 38 to form a small indent 40.

As previously indicated, cylindrical pilot member 33 has a diameter substantially the same as the small pilot hole previously drilled (not shown) in a desired directional alignment with respect to the workpiece. Pilot member 33 is engaged within the pilot hole so as to arrange tool 30 in coaxial alignment with the small hole whereby a concentric larger hole may be bored. Cutting point 38 defines the periphery of a concentric larger hole, edge 37 gouges out the interior of the hole, and cutaway segment 34 and indent 40 provide egress for the resulting chips.

The pilot member 33 illustrated in FIGS. 1, 2 and 3 is cylindrical in shape as can be seen from the drawings. The head 32 and the pilot member 33 can be formed such that the pilot member 33 is replaceable on the cutting head 32, and this may be done by forming a threaded aperture in the cutting head 32 and a corresponding threaded shaft extension on the pilot member 33.

Where precision work is not required, the pilot member 33 can be replaced by a self-feeding screw point 51 as illustrated in FIG. 4 or, by a brad point illustrated in FIG. 5. When the self-feeding screw point is utilized with the boring tool 30, no center or pilot hole need be drilled in the workpiece and the self-feeding screw point will maintain the boring tool 30 in substantial alignment as the boring tool 30 proceeds through the workpiece. The brad point illustrated in FIG. 5 although usable under normal circumstances, would have particular application when the workpiece happened to be of comparatively thin thickness.

One of the most important features of the present invention is the replaceability of the cutting blade 35 and the cutting point 38. If, for example, either the blade 35 or the cutting point 38 becomes dull, it can be readily replaced by turning the screws 36 or the screw 39, respectively. And also, if the workpiece happens to be of a material that can be best cut with either a deeper or a smaller depth of cut, then the blade 35 and cutting point 38 can be replaced by appropriate blades and cutting points. It is the replaceability of the cutting blade 35 and the cutting point 38 that adds greatly to the utility, long-life and efficiency of the boring tool 30.

FIG. 6 illustrates another embodiment of the invention and is similar to the other illustrated embodiments of the invention. Corresponding parts are numbered with corresponding numerals and the really only significant difference is the addition of the radial ribs extending at 90° angles from one another and integrally formed on a shoulder portion 62 integrally formed on the cutting head 32. The radial ribs 61 are provided for self-centering and are curved back as shown for easy withdrawal of the tool after the tool has formed the hole. The radial ribs 61 extend all the way to the periphery of the cutting head 32. Because of the fineness of the cut of the hole it was found a little difficult in centering the tool for withdrawal from the workpiece until the radial ribs 61 were added.

It is to be understood that the specific embodiments of the invention shown in the drawings described above are merely illustrative of some of the many forms which the invention may take in practice without departing from the scope of the invention as defined in the appended claims which are to be interpreted as broadly as possible, in view of the prior art.

I claim:

1. A tool for boring a relatively large hole in a workpiece; said tool comprising a rotatable shaft and a cutting head mounted on said shaft at one end thereof; said cutting head comprising a detachable cutting blade radiating outwardly and forwardly of a cutting head body portion and a detachable cutting point mounted on the periphery of said cutting head body portion and projecting forwardly of said blade for defining the periphery of said large hole; said head being cut away adjacent said blade and adjacent said point for chip egress; said cutting head having formed on one surface thereof opposite the surface from which said cutting point projects forwardly a plurality of radial fins extending rearwardly from the periphery of said cutting head body towards said rotatable shaft and each having a curvilinear configuration extending away from said cutting head body for guiding said tool whereby said tool is more readily withdrawn from said workpiece after said relatively large hole has been formed.

2. A tool for boring a relatively large hole in a work piece;
said tool comprising a rotatable shaft;
a cutting head body mounted on said shaft at one end thereof;
and pilot means comprising a self-feeding screw point extending coaxially from said shaft forwardly of said cutting head body;
said cutting head body having formed thereon a detachable cutting blade radiating outwardly and forwardly from said cutting head body for gouging out the interior of said large hole
and a detachable cutting point mounted on the periphery of said cutting head body and projecting forwardly of said blade for defining the periphery of said hole;
said head being cut away adjacent said blade and adjacent said pilot for chip egress;
said cutting head body having formed on one surface thereof opposite the surface from which said detachable pilot means projects forwardly a plurality of radial fins extending rearwardly from the said cutting head body towards said rotatable shaft and each having a curvilinear configuration extending from the periphery of said cutting head body for self-centering and guiding said tool as it is being withdrawn from said workpiece after completion of the formation of the hole.

3. A tool for boring a relatively large hole in a work piece;
said tool comprising a rotatable shaft and a cutting head mounted on said shaft at one end thereof;
said cutting head comprising a detachable cutting blade radiating outwardly and forwardly of a cutting head body portion and a detachable cutting point mounted on the periphery of said cutting head body portion and projecting forwardly of said blade for defining the periphery of said large hole;
said head being cut away adjacent said blade and adjacent said point for chip egress;
said cutting head having formed on one surface thereof opposite the surface from which said cutting point projects a plurality of radial fins extending rearwardly from the periphery of said cutting head body towards said rotatable shaft,
the outer edges of said fins being so formed and arranged so as to self-center and guide said tool when it is being withdrawn from the workpiece after the completion of the formation of the hole.

References Cited by the Examiner

UNITED STATES PATENTS

| 329,660 | 11/85 | Lord | 145—126 |
| 654,861 | 7/00 | Tyman | 145—125 X |
| 808,245 | 12/05 | Lund | 145—116 |
| 2,643,692 | 6/53 | O'Brien | 145—126 X |
| 3,008,359 | 11/61 | Mackey. | |

FOREIGN PATENTS 290,382  8/53  Switzerland.

WILLIAM FELDMAN, *Primary Examiner.*

DONALD R. SCHRAN, *Examiner.*